United States Patent Office 3,756,964
Patented Sept. 4, 1973

3,756,964
SUPPORTED COPPER CHROMITE CATALYST
John Robert Frazee, Gambrills, Brian Read Martin,
Catonsville, and Charles Philipp Brundrett, Baltimore,
Md., assignors to W. R. Grace & Co., New York, N.Y.
No Drawing. Filed Apr. 26, 1972, Ser. No. 236,460
Int. Cl. B01j 11/00, 11/06, 11/40
U.S. Cl. 252—454        10 Claims

ABSTRACT OF THE DISCLOSURE

A very effective supported copper chromite catalyst can be produced by reactively forming basic ammonium cupric chromate in the pores of the support, followed by calcination to yield a supported catalyst having the support pores loaded with copper chromite. The support which is used may be a silica, alumina, silica-alumina mixture, or an aluminosilicate. This supported copper chromite catalyst is very useful in hydrogenation reactions.

---

This invention relates to methods of forming supported copper chromite catalysts.

Copper chromite, which is usually designated $$XCuO \cdot Cr_2O_3$$

where X is a value of from .5 to 5, has been widely used as a catalyst for hydrogenating ketones, carboxylic esters, nitro compounds and the like. The processes of this invention are directed to methods for producing catalyst grade copper chromite by techniques which minimize the threat of any pollution of plant process waters. Prior to this time, copper and chrome laden waters could be allowed to enter adjacent waterways or a municipal sewage system, but with more stringent plant controls, this is not allowable. As a consequence, such metal laden streams have to be purified prior to any disposal.

This problem of plant effluent stream purification can be approached from essentially two different directions. One method is to install aqueous stream purification devices such as ion exchange devices, or to provide reaction vessels and to reactively precipitate the metal values. These however, are expensive solutions to the problem, although effective. The approach of this invention was to devise new clean methods of synthesis for copper chromite catalysts. The aim was to produce catalysts in such a way that little or no pollutants were produced. By such techniques, essentially the same synthesis plant equipment could be used with no requirement to add on expensive plant effluent stream treatment devices. A further and distinct advantage is that by the elimination of side products and the essentially full conversion of the original quantities of copper and chrome values to catalytic copper chromite, the cost per pound of producing this catalyst is decreased. In summary, the ultimate results of this invention are non-polluting methods for producing supported copper chromite catalysts, with each method producing higher yields of catalyst than prior art processes.

In brief summary, this invention consists of the feature of reactively forming the catalyst precursor basic ammonium cupric chromate within the support pores, followed by the conversion of this material to catalytic copper chromite. Conversion is effected by heating at 250° to 500° C. for from .1 to 20 hours. The basic ammonium cupric chromate is formed in the pores by either of two techniques. These techniques consists of first impregnating a solution of cuprammonium bicarbonate into the pores of the support, followed by the impregnation of a solution of either chromic acid or copper dichromate. The impregnated support is then dried and calcined to yield the supported copper chromite catalyst.

In more detail, this invention consists of a new method for producing inorganic oxide supported copper chromite catalysts. The uniqueness of this method resides in the reactive formation of the copper chromite precursor within the support pores. Prior methods of producing supported copper chromite catalysts usually consisted of either comixing copper chromite powder with powdered support, and pelleting, pilling, extruding, balling or otherwise shaping the comixture followed by drying and calcining, or coating the support with an ammonical solution of basic ammonium cupric chromate followed by drying and calcining. These techniques have several disadvantages, a prime one being a lack of uniformity of impregnation of the copper chromite within the support pores. The present process produces a very uniformly impregnated supported copper chromite catalyst.

Essentially any inorganic oxidic support can be used. These include titanias, magnesias, zirconias, aluminas, silicas, aluminosilicates and mixtures of these materials. However, the preferred supports are silicas, aluminas, aluminosilicates or mixtures of these materials. This support can be in essentially any particle size. That is, the support can be in a powdered or a bulk form. If in a powdered form, it will be shaped as by extrusion, pilling, pelleting, balling or granulating either after the final impregnation or after calcination. If in a bulk form such as an extrusion, pellet, pill, ball or granule, the material need only be calcined after impregnation. For plant operations it is preferred to use bulk forms due to the ease of handling and processes operation, although impregnation times are slightly longer.

After the selection of the support material, the first impregnation solution is prepared. This first impregnation solution is a cuprammonium carbonate solution. This solution is actually an equilibrium mixture of cuprammonium carbonate and cuprammonium bicarbonate. In an aqueous admixture, there will be partial hydrolysis of cuprammonium carbonate to cuprammonium bicarbonate. For simplicity in this application, this will be designated as cuprammonium bicarbonate since aqueous mediums are to be used. This solution can be formed by either of two very useful methods, the first being the reaction of basic copper carbonate with ammonium hydroxide and ammonium carbonate. This reaction is exemplified by the following equation:

(1) $CuCO_3 \cdot Cu(OH)_2 + 2NH_4OH + 3(NH_4)_2CO_3 \rightarrow$
$2Cu(NH_3)_4(HCO_3)_2 + 4H_2O$ A second method for producing the cuprammonium bicarbonate solution consists of the reaction of copper metal with an aqueous ammonium carbonate solution. The reaction is conducted at room temperature with a continual bubbling of an oxygen containing gas through the solution. The bubbling of an oxygen containing gas oxidizes the copper to the cupric ion state and promotes reaction with the ammonium carbonate. This reaction is exemplified by the following equation:

(2) $Cu + 2(NH_2)_2CO_3 + \frac{1}{2}O_2 \rightarrow$
$Cu(NH_3)_4(HCO_3)_2 + H_2O$ The cuprammonium bicarbonate solution is adjusted to contain any desired concentration up to the maximum solubility of cuprammonium bicarbonate, and is contacted with the oxidic support. A quantity of cuprammonium bicarbonate solution is used so as to at least completely fill the pores of the support. Preferably an excess of solution should be added. This quantity of cuprammonium bicarbonate solution can be calculated from the pore volume of the support.

The exact mode of impregnation is not critical. It has been found very useful to merely mix the dry support into the cuprammonium bicarbonate solution allowing a sufficient time for the solution to fill the pores. This loaded support is then vacuum or air dried at from about 90° C. to 225° C. for from .5 to 5 hours.

The next step is to impregnate the support with the second reactant. The second reactant is either a solution of chromic acid or a solution of copper dichromate. Copper dichromate, which is the preferred second solution, is readily produced by the reaction of basic copper carbonate with chromic acid. The concentration of the copper dichromate solution is any desired concentration, up to the maximum solubility. The volume of solution used is at least enough to saturate the support. After impregnation, the catalyst is dried at 90° C. to 225° C. during which time the impregnated cuprammonium bicarbonate and cupric dichromate react to form basic ammonium cupric chromate. This reaction is exemplified by the following equation:

(3) $Cu(NH_3)_4(HCO_3)_2 + CuCr_2O_7 + 2H_2O \rightarrow$
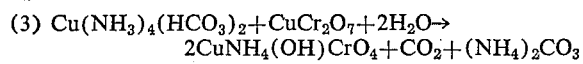
$2CuNH_4(OH)CrO_4 + CO_2 + (NH_4)_2CO_3$ The other useful second reactant is a chromic acid solution. This solution may contain any desired concentration, up to the maximum solubility of chromic acid calculated as chromium trioxide. Sufficient solution is used so as to fully saturate, fill the pores of, the previously impregnated support. After impregnation, the support is dried at 90° C. to 225° C., during which time basic ammonium cupric chromate forms within the pores. This reaction is exemplified by the following equation:

(4) $Cu(NH_3)_4(HCO_3)_2 + CrO_3 + 2H_2O \rightarrow$
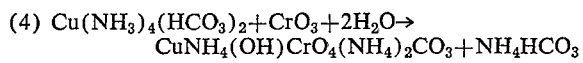
$CuNH_4(OH)CrO_4(NH_4)_2CO_3 + NH_4HCO_3$ In a final step, regardless of which second reactant solution was used, the loaded support is calcined in order to convert the basic ammonium cupric chromate to copper chromite. This calcination consists of a heat treatment at about 250° C. to 500° C. for from .1 to 20 hours. The principal reaction which occurs is exemplified by the following equation:

(5) $2CuNH_4(OH)CrO_4 \xrightarrow{heat} 2CuO \cdot Cr_2O_3 + N_2 + 5H_2O$

As is evident, these processes can be easily modified to produce copper chromite having a varying ratio of copper content to chrome content. By the selective adjustment of the first and second reactant solution concentrations, the degree of impregnation of the reactants can be changed relative to each other. Also, by adjustment of the time duration of control of each reactant solution with the support, the copper content to chrome content can be varied. By having this capability of varying the copper and chrome contents, copper chromite catalysts can be tailored to achieve optimum results for each reaction. This capability is a significant advantage since no further process equipment is required to produce differing catalysts.

Other variations in the present concept can also be made. However, any related method of reactively forming copper chromate within the pores of the catalyst is considered to be within the scope of the present invention and particularly methods which preclude the discharge of any pollutants to the air or plant effluent water. The copper and chrome value containing solutions are reused thereby, also conserving these metals, and the only effluent to the air is carbon dioxide, nitrogen and water vapor. These are therefore what can be termed "very clean" processes.

The following examples are set out to further amplify the present invention.

EXAMPLE 1

880 gm. (db) portion of catalyst was prepared as follows:

First impregnation.—49.1 gms. of basic copper carbonate, $CuCO_3 \cdot Cu(OH)_2$ was dissolved by slow addition to a solution containing 100 cc. ammonium hydroxide, $NH_4OH$, (28–30 percent $NH_3$) and 24 gms. of ammonium carbonate, $(NH_4)_2 \cdot CO_3$. The total volume of the solution was brought to 1590 cc. since the base had a saturation point of 2.06 cc./gm. The impregnation was made on 748 gms. (Dry Basis at 1750° F.) of 3/16 inch ID silica gel extrusions and the material was dried at 250° F. under vacuum for 5 hours.

Seond impregnation.—49.1 gms. of basic copper carbonate, $CuCO_3 \cdot Cu(OH)_2$ was dissolved by slow addition in a solution containing 85.0 gms. of chromic acid, $CrO_3$. The total volume of the solution was brought to 965 cc. since the once impregnated base had a saturation point of 129 cc./gm. The impregnation was made on the once impregnated base and the material was dried in air at 250° F. for 16 hours. The dried catalyst was then activated for one hour at 700° F.

The composition of the finished catalyst stated in this example was: 7.30 weight percent copper, CuO; 5.95 weight percent chromium, $Cr_2O_3$; and 86.75 weight percent silica, $SiO_2$.

EXAMPLE 2

This example was made as in Example 1 except that the used was 1/16 inch ID silica gel extrusions and the finished catalyst was activated for one hour at 700° F. followed by one hour at 800° F.

EXAMPLE 3

This sample was made as in Example 1 except that the base used was 6 by 10 mesh ID silica gel granules. The once impregnated base was dried in air and the finished catalyst was activated for one hour at 700° F. and one hour at 800° F.

What is claimed is:

1. A method for producing a supported copper chromite catalyst comprising impregnating an inorganic oxidic support with a first reactant solution selected from the group consisting of cuprammonium carbonate solutions, cuprammonium bicarbonate solutions and mixtures thereof; then impregnating said support with a second reactant solution selected from the group consisting of chromic acid solutions and copper dichromate solutions; heating said support at about 90° C. to 225° C. for from .5 to 5 hours to convert the impregnated reactants to basic ammonium cupric chromate; and heat treating said support at about 250° C. to 500° C. for from .1 to 20 hours, thereby converting basic ammonium cupric chromate to copper chromite.

2. A method as in claim 1 wherein after impregnation of said support with said first reactant solution said support is dried at about 90° C. to 225° C. for from .5 to 5 hours prior to the impregnation of said support with said second reactant solution.

3. A method as in claim 2 wherein said inorganic oxidic support is selected from the group consisting of silica, alumina, aluminosilicates and mixtures thereof.

4. A method as in claim 3 wherein said oxidic support is a silica.

5. A method as in claim 3 wherein said oxidic support is alumina.

6. A method as in claim 3 wherein said oxidic support is an aluminosilicate.

7. A method as in claim 3 wherein said oxidic support is an extrusion.

8. A method as in claim 1 wherein said inorganic oxidic support is first impregnated with a solution selected from the group consisting of a cuprammonium carbonate solution, cuprammonium bicarbonate solution or mixture thereof, and dried at 90° C. to 225° C. for about .5 to 5 hours; then impregnated with a solution from the group consisting of chromic acid solutions and copper dichromate solutions, dried at 90° C. to 225° C., and heat treated to form said copper chromite.

9. A method as in claim 8 wherein said inorganic oxidic support is selected from the group consisting of silica, alumina, aluminosilicates and mixtures thereof.

10. A method as in claim 9 wherein said inorganic oxidic support is an extrusion.

References Cited
UNITED STATES PATENTS

| | | | |
|---|---|---|---|
| 2,129,507 | 9/1938 | Salzberg | 252—458 X |
| 2,170,854 | 8/1939 | Drake | 252—458 X |
| 2,265,682 | 12/1941 | Bennett et al. | 252—458 X |
| 2,891,094 | 6/1959 | Karkalits, Jr. et al. | 252—454 X |

CARL F. DEES, Primary Examiner

U.S. Cl. X.R.

252—455 R, 458, 465, 476